Oct. 3, 1972     H. G. LANGE     3,695,871

METHOD OF SCREENING A COLOR IMAGE REPRODUCING DEVICE

Filed Nov. 27, 1970

Inventor
Howard G. Lange
By Francis W. Crotty
Attorney

United States Patent Office 3,695,871
Patented Oct. 3, 1972

3,695,871
METHOD OF SCREENING A COLOR IMAGE REPRODUCING DEVICE
Howard G. Lange, 1731 N. Stratford Road, Arlington Heights, Ill. 60004
Original application June 4, 1969, Ser. No. 830,288. Divided and this application Nov. 27, 1970, Ser. No. 93,305
Int. Cl. G03g 13/22
U.S. Cl. 96—1.2
9 Claims

ABSTRACT OF THE DISCLOSURE

The screen of a three gun shadow mask type of color cathode-ray tube is formed of three interleaved sets of filters, with the filters of each set predominantly transmissive of an assigned one of the primary colors green, blue and red. The filters are circular and are of such diameter that their outer peripheral portions overlap, leaving a central section of each filter free to accept a phosphor that emits light of a wavelength for which the associated filter is predominantly transmissive. The screen, in effect, has a multiplicity of elemental picture areas grouped to form color triads and individually surrounded by a filter that attenuates substantially all visible light.

Screening is accomplished with photosensitive coatings that are selectively exposed by actinic energy projected through the shadow mask. Each such exposure develops an image of one set of filters which is then developed. This process is conducted for each of the three colors to form three sets of filters with overlapping peripheral portions. Thereafter or essentially at the same time, the phosphor materials are deposited with the emission of each phosphor material properly correlated colorimetrically with the filter over which it is superposed.

Related Patents and Applications

This application is a division of application Serial No. 830,288, filed June 4, 1969 now U.S. Pat. No. 3,569,761, issued Mar. 9, 1971.

The screen structure is closely related to that described and claimed in U.S. Pat. 3,114,065, issued Dec. 10, 1963, in the name of Sam H. Kaplan and also in Pat. 3,146,368, issued on Aug. 25, 1964, in the name of Joseph P. Fiore et al. The process of screening is related to that described and claimed in Pat. 2,959,483, issued Nov. 8, 1960, in the name of Sam H. Kaplan and in Pat. 3,475,169, issued Oct. 28, 1969 in the name of Howard G. Lange. All of these related patents and the related application are assigned to the assignee of the present invention.

BACKGROUND OF THE INVENTION

The present invention is directed to the screen of, and the method of screening, a color image reproducing device such as a color cathode-ray tube.

While the method concept is of general application, it is especially advantageous in the fabrication of color tubes that require the elemental phosphor deposits to be smaller in size than the transparent portions of the color-selection electrode characteristically included in such a tube. More specifically, where the tube is of the three-color shadow mask variety, having phosphor deposits in the form of dots arranged to constitute a multiplicity of dot triads, it is necessary that the phosphor dots be smaller than the apertures of the shadow mask if the tube employs either post-deflection focus or black surround. Each of these features is attractive.

Post-deflection focusing has the advantage of focusing the electron beams to the end that more electrons impinge upon the elemental phosphor areas of the screen than otherwise and thus enhanced brightness is obtained. Black surround, on the other hand, is an expression used to define a color tube in which the elemental phosphor deposits are surrounded by a pigment or light-absorbing material, such as manganese dioxide. The use of a circumscribing light-absorbing material improves the contrast of the picture tube and has the further benefit of reducing the need of, if not making totally unnecessary, the darkened or filter type implosion plate that is generally employed in commercial color television reecivers. This attribute of black surround substantially increases the brightness of the tube as more fully described in the afore-identified Fiore et al patent.

Some difficulty has been experienced in screening a color tube to attain phosphor elements that are smaller in size than the transparent areas of the color-selection electrode. The problem is generally the same whether the phosphor elements are round or take the form of stripes. There presently is a preference to the use of phosphor dots and, accordingly, the description will continue on the assumption that the tube in process is to exhibit a mosaic type of screen formed of dot triads over the entire image area. As is well understood, each such triad includes a dot of green, a dot of blue and a dot of red phosphor.

The conventional methods of screening such a tube entail applying to the image area a coating of a photosensitive material which is selectively exposed to actinic energy or radiation directed through the shadow mask. An obvious advantage derives from exposing through the shadow mask that is ultimately to be installed as a component of the tube in process in that this establishes the proper positions of the phosphor deposits on the screen in relation to the apertures of the mask. In the general case, it can be expected that the elemental areas of the screen exposed through the shadow mask will have the same configuration and at least approximately the same size as the holes of the mask through which the exposing radiation passes. Accordingly, in an effort to have the phosphor deposits smaller in size than the apertures of the mask, it has been suggested that the apertures of the mask be temporarily closed down by a filler or cladding of a material that may be readily removed after the mask with its holes of temporarily reduced size has been used in screening. For example, one may adopt copper or other metals as a filter to be removed by selective etching after the screening has been accomplished. Experience indicates, however, that the use of a temporary filler leads to problems of uniformity in dot size and configuration.

In a process that lends itself more effectively to commercial production, the shadow mask is originally formed with holes properly sized to be used in screening so that the phosphor deposits are of the proper diameter or dimension. With this approach, the mask is re-etched after the screening has been accomplished in order to open up or enlarge the holes to a desired size relative to the phosphor dots that have been deposited on the image area of the screen. A process of this type that has been used successfully in production is the subject of application Ser. No. 811,318, filed Mar. 28, 1969 in the name of Sam H. Kaplan and assigned to the assignee of the present invention.

It is highly desirable to screen a color cathode-ray tube of the type under consideration in a process that does not require added processing steps for the shadow mask and this objective is attainable through the present invention.

Accordingly, it is an object of the invention to provide a new and improved screen structure for a color image reproducing device that is especially attractive in practicing black surround, post-deflection focusing and the like.

It is another important object of the invention to provide a new process for forming the screen of such a color image reproducing device.

It is a particular object of the invention to provide a screening process for forming elemental phosphor deposits on the screen of a color image reproducer that are smaller than the apertures of the shadow mask without requiring modification of the mask either before or after its use in screening.

SUMMARY OF THE INVENTION

A screen for a color image reproducing device, embodying the invention, comprises a substrate that is substantially transmissive of all light wavelengths in the visible spectrum. A plurality of sets of image elements are disposed in an interleaved pattern over the substrate with the elements of each such set excitable to emit light of an assigned one of a corresponding plurality of primary colors. An attenuator for visible light wavelengths is disposed ony on the portions of the substrate that surround the image elements of each of the sets and this attenuator comprises oevrlapping filters which individually have a relatively high transmission efficiency for light of only an assigned one of the primary colors and a relatively low transmission efficiency for light in the remainder of the visible spectrum.

The method of the invention for forming such a screen comprises appying to the image area a purality of sets of filters that individually have a relatively high transmission efficiency but for light of only an assigned one of the plurality of primary colors involved. The filters are applied with such dimensions and such arrangement as to have overlapping peripheral portions which form over the screen a composite filter for attenuating substantially all wavelengths in the visible spectrum and patterned to surround a multiplicity of spaced elemental portions of the image area which individually have a high transmission efficiency for light of an assigned primary color. A phosphor is applied to each of those elemental portions of the image area which, when excited by electron bombardment, for example, emits light which, preferably, predominates at the wavelength assigned to the particular elemental area of the screen to which that phosphor has been applied.

In the simplest embodiment of the process for screening a tube which has a shadow mask with circular apertures, the individual filters are circular. They cover the multiplicity of elemental image areas which contribute to image reproduction and individually extend beyond the assigned elemental image area to overlap with others of the filters in the portions of the screen that surround the elemental image areas, imparting to such portions of the screen the property of attenuating light in the visible spectrum. Where the filter components are formed by exposing a photosensitive layer through the apertures of the shadow mask, there is useful control of the diameter of the filter resulting from the fact that the exposed portions of the layer will, in general, have the same configuration as the hoes of the shadow maks and will have an area that varies as a function of the intensity of the radiation and the length of the exposure interval.

DESCRIPTION OF THE DRAWING

The features of the present invention which are believed to be novel are set forth with particularity in the appended claims. The invention, together with further objects and advantages thereof, may best be understood by reference to the following description taken in connection with the accompanying drawing, in the several figures of which like reference numerals identify like elements, and in which:

DESCRIPTION OF THE PREFERRED EMBODIMENTS

As stated above, the invention is useful whether the screen is made of phosphor elements that are generally circular or in the form of stripes but, for convenience, the now familiar dot triad type of screen will be described. It is also to be noted that the configuration of the tube is of no particular consequence. The invention is equally useful for tubes having round as well as rectangular image areas. In either case, the envelope has two principal sections that are initially separated from one another which is a convenience in screening. One of these sections is referred to as the cap or faceplate section which is constituted of the screen or image area and a circumscribing flange. The other section is conical and is configured as well as dimensioned at its large end to match the flange of the faceplate so that they may ultimately be united through a frit sealing or other suitable integrating process. The smaller end of the conical section terminates in a neck which houses an assembly or cluster of three electron guns, certain of the electrodes of which are conductively connected terminal prongs of a base applied to the end of the neck. The tube structure, aside from its screen and the method of making that screen, may all be conventional and will not be considered further herein.

Figure 1:
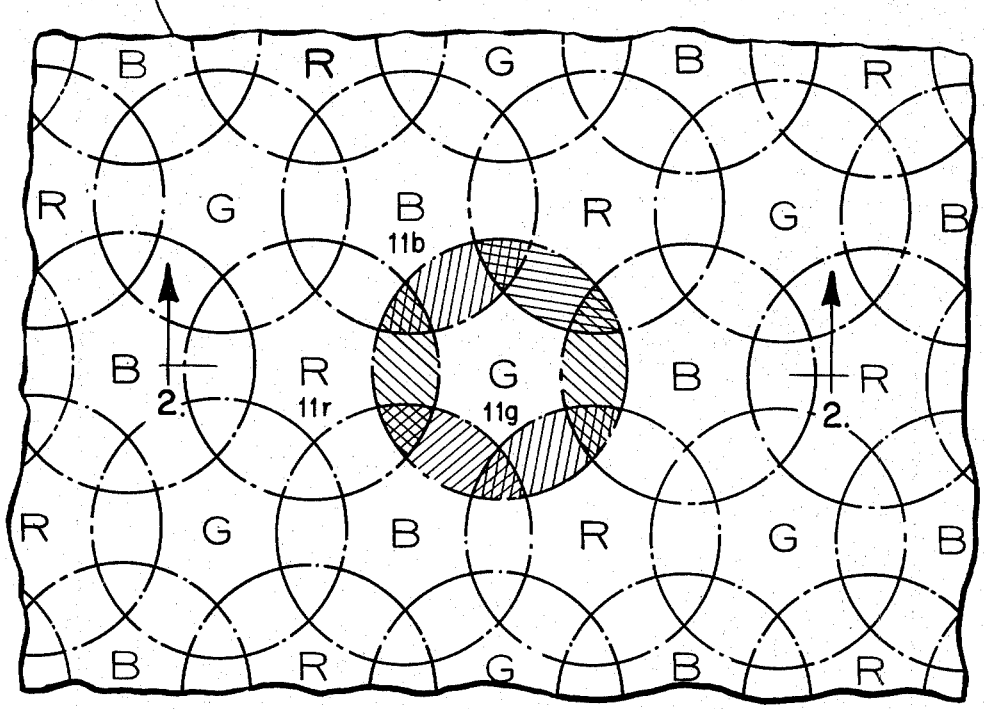
FIG. 1 is a fragmentary plan view of a portion of the image screen of a color image reproducing device constructed in accordance with the invention.
Figure 2:
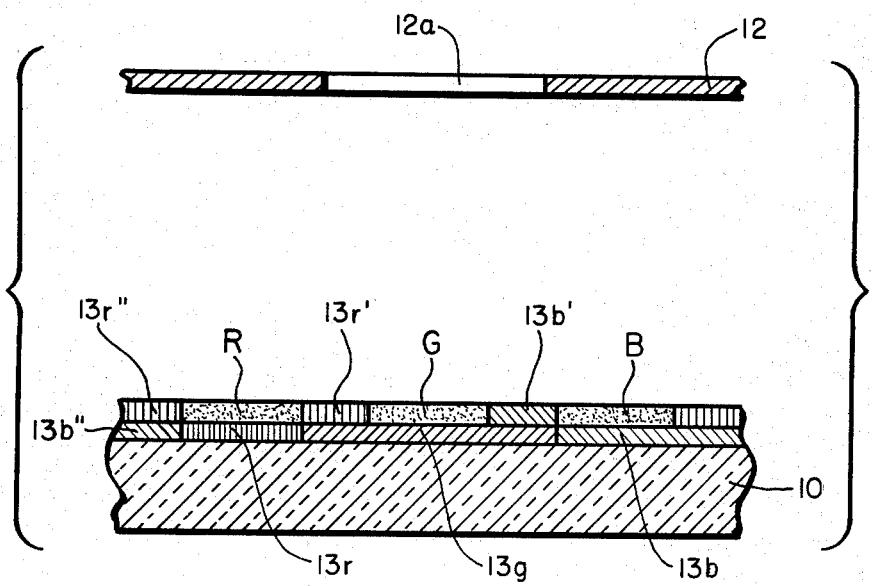
FIG. 2 is a view taken on section line 2—2 of FIG. 1.

The characteristics of the screen are illustrated in FIGS. 1 and 2 which show a fragment of a substrate 10 that is substantially transmissive of all light wavelengths in the visible spectrum. The substrate, of course, is the image area or faceplate of; the picture tube and may be 100 percent transmissive to visible light, or it may have some filtering attributes further to enhance contrast by having a transmissivity for visible light of perhaps 90 percent or less. From the standpoint of material, it is a known composition of glass conventionally used in forming the envelope of a color cathode-ray tube; there is nothing unique required of the material of the faceplate.

A plurality of sets of image elements are disposed in an interleaved pattern over substrate 10 characterized by the fact that the elements of each such set are excitable to emit light of an assigned one of a corresponding plurality of primary colors. These image elements are deposits of various phosphor materials that are related colorimetrically so that they add to produce white. In the conventional three color additive system of image reproduction currently in commercial use the primary colors green, blue and red are employed and the corresponding phosphor deposits are designated by the letters G, B and R in the drawing. In the representation of FIG. 1, it is clear that each such phosphor deposit approximates a dot configuration although, specifically, it is a six-sided cusp shape figure per force of the manner in which its outline is defined as will be explained presently.

Where the tube is of the shadow mask variety in which the color-selection electrode is a mask with a field of circular apertures, these elemental phosphor deposits G, B and R may be said, at least to a first approximation, to have a configuration that is generally the same as the apertures of the mask. Since their location on the screen and specific shape result from an exposure of the image area with actinic radiation or energy directed through the apertures of the mask, each set of image elements, be it the deposits of green, blue or red phosphor, is distributed over the image area in the same pattern as the pattern of apertures in the shadow mask. Moreover, the relative positions of the image elements of the three sets are determined by the position of the source of actinic energy in each of three exposure steps in essentially the same manner as conventional photoresist slurry screening processes for depositing phosphor dots on a mosaic screen of the type under consideration. For this reason, while the three sets of image elements are arranged in accordance with the same pattern, the patterns are interleaved with one another over the substrate and collectively define the desired multiplicity of dot triads. One such triad, for example, is identified by reference to characters 11g, 11r and 11b in FIG. 1. One additional characteristic of the image elements is to be noted, namely, each such element has a principal dimension that is smaller than the corresponding dimension of the electron transparent areas or holes of the color-selection electrode. For example, the maximum dimension of image element 11g is smaller than the hole diameter 12a of the mask 12, a fragmentary portion of which is shown in FIG. 2. In order to avoid unnecessary confusion to FIG. 1, the representation of the mask has been omitted from that view. When the shadow mask is properly installed in operative position in relation to image area 10, the mask holes 12a are in alignment with an assigned triad such as 11g, 11b and 11r. The registration of the mask holes with respect to the triads is well understood and makes possible color selection by reason of the fact that electron beams passing through such holes selectively impart only an assigned one of the three sets of image elements. In the usual case, the tube has three electron guns each of which directs an electron beam to screen 10 through the holes of the mask and the angular relation of the beams to the mask is such that one beam impacts only upon green image elements G, another impacts only upon blue image elements B, while the third impinges solely on red image elements R. For the central portion of the screen this angular relationship is established by the geometry of the gun cluster and the necessary relation is maintained as the beam scans over the mask and the screen through the influence of a dynamic convergence system (not shown) which need not be described since it is a structure and function that is well understood in the color image reproducing art.

One desirable characteristic of the image elements necessary to a post-deflection focus or black surround type of screen has already been discussed; that is that the effective area of the elemental phosphor deposits is smaller than the area of the holes in the aperture mask. The expression "effective area of the elemental phosphor deposits" is used to mean that portion of the phosphor deposit that contributes to image reproduction. Obviously, any portion of a phosphor deposit that overlies a visible-light attenuator is ineffective in image synthesizing and may be ignored. Another characteristic that is necessary if the screen is to feature black surround is an attenuator for visible light wavelengths disposed on the portions of the screen or substrate that surround the several image elements of each of the three sets of elements and such an attenuator is indicated by the crosshatching in FIG. 1 that surrounds image element 11g. While crosshatching has been utilized with respect to this single element simply for the purpose of emphasis, it will be understood that all image elements on the screen are provided with a similar visible light attenuator. The attenuator comprises overlapping filters which individually have a relatively high transmission efficiency for light of only an assigned one of the primary colors and a relatively low transmission efficiency for light in the remainder of the visible spectrum. Ideally, the filter components could be confined simply to the portions of the substrate shown in crosshatching in FIG. 1 that surround the image elements and in such a case, substrate 10 may be transmissive of all primary color and the phosphor component of each image element would be chosen to be predominantly emissive of the color assigned to that particular element. In the illustrative case, specifically element 11g, the phosphor deposit would simply be green phosphor of any known composition exhibiting the desired color coordinates.

In accordance with the invention, however, greatly improved processing simplicity is achieved by using a specifically different structure in which each of the filter components is disposed over its associated image element and extends over the portion of the substrate separating that image element from its neighbors to constitute in this fashion one component of the overlapping filters of the light attenuator. This is most clearly represented in FIG. 2 where the filter component of the green image element 11g is designated 13g. It is applied directly over substrate 10 and the green phosphor G is, in turn, coated over its associated filter component 13g. Clearly, the diameter of the filter component 13g exceeds the maximum dimension of the phosphor deposit G and the filter component therefore extends beyond the area of the image element G. In like fashion, there is shown in FIG. 2 a blue filter component 13b which is assumed to have been applied to substrate 10 after the application of the green filter component 13g. As a consequence, portion 13b' of the blue filter component overlaps the corresponding peripheral portion of the green filter component 13g. In like fashion, the red filter component 13r has a peripheral portion 13r' that extends over the contiguous portion of the green filter component 13g. Assuming the red filter to have been the last of the three to be applied, it will have another peripheral portion 13r'' which overlaps a portion 13b'' of the blue filter component. These overlapping peripheral portions of the filter components are represented by the crosshatching in FIG. 1. If the filter components are properly related colorimetrically, any portion of screen 10 where two or more of such filters overlap is essentially black, that is to say, has an exceedingly low transmission efficiency in the neighborhood of 10 to 20 percent or less for all wavelengths in the visible spectrum.

The described screen structure is functionally similar to that of the above-identified Fiore patent but is structurally quite different. The reference patent shows each image element to be constituted of a phosphor deposit that is surrounded with a light-absorbing pigment, whereas in the described arrangement light attenuation in the regions between image elements is achieved by a visible-light attenuator surrounding each image element and comprised of overlapping filters which individually have a relatively high transmission efficiency for light of a particular assigned primary color but a low transmission efficiency for light in the remainder of the visible spectrum.

The materials suitable for the various filter components may be those described in Kaplan Pat. 3,114,065 and they may be applied through a process similar to that claimed in its parent, namely Pat. 2,957,483. More specifically, vitreous color filter materials having a relatively low fusing temperature of the order of 430° C., which are commercially available, are suitable for use as the filter components. Illustrative designations of appropriate commercially available materials are Corning Glass No. 7570, marketed by Corning Glass Works, and Corning Glass No. 8363. The latter is especially suitable because it has a thermal coefficient of expansion which matches that of the glass normally employed in color cathode-ray tube envelopes. A similar type of glass is available from Kimbal Glass Company under the designation No. 50 solder glass which also has an acceptable fusion temperature. Basically, these glasses are lead borate types to which inorganic colorants are added to provide the necessary color filter characteristics. For example, cobalt oxide may be used as a color for the blue filter components, copper oxide or chromium oxide for green and cadmium sulphide for red. Vitreous materials of this type are advantageous because they are known to be compatible with high vacuum cathode-ray tubes. Additionally, they may be applied to the surface of substrate 10 by photoprinting and electrostatic techniques quite similar to those employed in depositing phosphor color materials. Their low fusing temperatures make possible affixing the filter components to substrate 10 in the course of normal tube processing without the need for special processing temperatures which might introduce the possibility of damage to the phosphor deposits.

The methods described in Pat. 2,959,483 are generally useful in screening the structure of FIG. 1 although specific changes will be necessary because the screen of the present invention includes not only a filter component and superposed phosphor component collectively defining an image element as in the Kaplan patent but additionally have extensions of the filter component into the spaces that surround its image element to cooperate with similar extensions of the filter components of the adjacent image elements to constitute the light attenuator or black surround.

Slurry screening with a photosensitive resist including filter material in pulverulant form is an acceptable process. A convenient slurry comprises an organic photosensitive material that is normally soluble in water, such as polyvinyl alcohol sensitized with ammonium dichromate. If such a slurry includes a green filter of powdered fusible material, it may be applied in the usual manner as a coating over the entire substrate 10. This provides a surface condition to the substrate that may be altered by exposure to actinic energy, such as ultraviolet light. In the next process step, the shadow mask 12 is installed in its proper position relative to screen 10 and the ultraviolet source is positioned to simulate the electron gun of the tube that is intended to excite the green target elements or phosphor deposits. The energy source then directs ultraviolet light through apertures 12a of shadow mask 12 to selectively expose the coating of substrate 10 and thereby create a latent image of the set of green filter components. This exposure, of course, takes place in an exposure chamber or lighthouse and the exposed portions of the polyvinyl alcohol coating are a set of circular and spaced separated areas of the screen having the same pattern arrangement as the holes of the mask. It is known that the diameter of each exposed area is subject to control by the intensity of the light and the duration of the exposure interval. These parameters are adjusted to the end that the latent image of the green filter components has the size shown in FIG. 1 by the broken construction line. This image is then developed by washing substrate 10 with water to complete forming the set of green filter components 13g on substrate 10. The individual green filter components have, in effect, the configuration of a projection of the aligned hole of the shadow mask and are round since the mask has been assumed to have circular apertures 12a.

A similar sequence of steps is carried out for each of the other sets of color filter components. The only changes required in forming the blue filter components 13b are the use of a photosensitive resist which has a blue filter material in powdered form rather than green and the positioning of the exposure light source which must be modified to simulate the electron gun intended to energize the blue image elements. In forming the red color filter components 13r, the photoresist slurry has a red filter ingredient and the light source is positioned to simulate the electron gun assigned to excite the red image elements.

The screen at this stage in the processing has the three interleaved patterns of green, blue and red color filter components with their outer peripheral portions in overlapping relation to define a visible-light attenuator surrounding elemental image areas of substrate 10 and each such area is covered by a single color filter that transmits essentially only the color or wavelength of light that has been assigned to it. It is now only necessary to apply the deposits of the green, blue and red phosphors over their assigned elemental image areas where each phosphor deposit is superposed over an associated and colorimetrically related filter component. Each color phosphor may be applied through essentially the same steps utilized in forming the filter components. The only significant difference has to do with the exposure interval, assuming that the light source has essentially the same intensity for all exposure steps. One may, of course, use the same exposure interval in which case the phosphor deposit is co-extensive in an area with its associated filter component. This certainly is not necessary and a shorter exposure time may be employed since it is only necessary that the phosphor be deposited over the cusped type central area of the associated filter component. This makes clear that there is a desirable tolerance with respect to screening of the phosphor materials. So long as the minimum phosphor dot size is attained, there is no adverse effect if the deposit extends beyond the limits of the image element into the attenuator simply because the attenuator suppresses light that might be emitted from portions of the phosphor deposited within the area of the visible-light attenuator.

After the phosphor deposits have been made, the screen may be filmed and aluminized in the usual fashion and the filter components will be affixed to substrate 10 by fusion either in a separate heat treatment step or during bakeout.

The screen structure of FIG. 1 may also be processed through the techniques of electrostatic screening described and claimed in Pat. 3,475,169 of Howard G. Lange. In electrostatic screening, substrate 10 is first provided with coating of conductive material over which is superposed a coating of a photoconductor, both preferably being organic so as to be eliminated in bakeout. The screen is then subjected to a corona discharge in order to establish a uniform charge over the entire photoconductor. At this juncture, the screen is exposed to ultraviolet light through the shadow mask to establish a latent charge image of the green filter components and that image is developed by applying to the image area a polarized toner which contains fusible green filter material in powdered form. The polarity of the toner is determined by whether direct or reverse imaging is desired. If it be assumed that each exposed area is discharged and the filter material is to be deposited on the discharged areas, the toner is provided with the same polarity as the polarity of the charge on the photoconductor. This is referred to as reverse imaging. Direct imaging occurs where the polarity of the toner is opposite that of the charge on the photoconductor in which case the toner is attracted to the portions of the photoconductor that retain a charge after exposure. The Lange patent sets forth formulations of the conductive and photoconductive layers required for the substrate and characterized by the fact that they are organic and are easily removed during bakeout. This same general process is carried out for depositing each of the filter components and then for depositing each of the phosphor components with due regard, in each instance, to the position of the light source, the exposure interval and the ingredients and polarity of the toner. Insofar as these matters are concerned, the screening process is very similar to that described above utilizing sensitized polyvinyl alcohol. Of course, if the three sets of filter components are applied one after the other and then the phosphor components are sequentially applied, it is necessary to recharge the photoconductive layer after the application of each of these various filter and phosphor components. Certain simplifications, however, are possible with electrostatic screening.

It is believed possible, for example, to apply the filter and phosphor components to one set of elemental image areas concurrently. Assume that the photoconductor has been selectively exposed to create a latent charge image of the set of green filter components. If the toner used to develop the latent image includes both the powdered form of filter material and powdered phosphor material in suspension, they will settle out together and be deposited concurrently in the discharged areas of the screen. Desirable stratification may still be obtained if the filter and phosphor materials have appropriate relative densities. For example, if the filter is made of a heavy material such as lead glass, it will settle out first and the phosphor will then be superposed on the filter as preferred.

It is not necessary that the toner convey both the filter and phosphor materials simultaneously. For example, after one latent image has been established, by exposing the previously charged photoconductor, a toner carrying filter material may be applied and the excess poured out after the filter material has been deposited. Sufficient residual charge will remain on the photoconductor to now permit the introduction of a second toner carrying phosphor material which will then deposit over the filter, establishing the desired stratification. This has the advantage of applying both the filter and phosphor materials of one set of image elements without the necessity of recharging the photoconductor. In this case, however, the filter and phosphor components of one set of image elements is completely deposited after which the image elements of the remaining sets are similarly created. This will be a faster process than the first described one in which the three sets of filter components were first applied following which the three sets of phosphor components were deposited. In another variant of the process, a toner with a filter may be poured over the image area to develop the latent image of one set of the filter components and, after the filter material has been deposited, phosphor material of the appropriate color may be applied, as by spraying, over the toner to settle therethrough and deposit on top of its associated filter component.

In any of the electrostatic screening processes in which the phosphor is deposited directly over its associated filter without recharging of the photoconductive layer, the filter and phosphor components of the image elements will be coextensive in size rather than as shown in FIG. 2 where the phosphor component G, for example, is smaller than its filter component 13g. In such case, the overlapping filter components 13b' and 13r' of neighboring image elements and their phosphor components overlie phosphor component G as well as its filter component 13g. Preferably, those filter and phosphor components that do overlie illustrative phosphor component G shall have a thickness, in relation to the electron velocity of the scanning electron beams during operation of the tube, to attenuate the impinging electrons to the end that they do not penetrate to phosphor component G with sufficient velocity to excite it. Otherwise, the area of the screen surrounding illustrative image element G, 13g tends to emit green light rather than functioning in its intended mode of a visible-light attenuator.

While electrostatic screening, including photographic techniques with exposure to ultraviolet light to create a latent charge image, has been described, analogous results may be attained by scanning a layer of organic insulating material applied to the image area with an electron beam located at the appropriate simulated color center and having access to the image area only through the apertures or electron transparent portions of the color-selection electrode. A screening process of this type is described and claimed in copending application, Ser. No. 773,829, filed Nov. 6, 1968, in the name of Howard G. Lange. Such a process also permits conveniently attained desired relative sizes of the exposed elemental areas of the screen and the apertures of the color-selection electrode.

This simultaneous deposition of filter material and phosphor material, simultaneous in the sense that both materials are employed in developing a single latent charge image whether actually applied together or seriatim, has been described in the environment of a species of black-surround shadow-mask color cathode-ray tube where it has especially attractive advantages. Of course, this screening process does have general application and may be employed, for example, in screening more conventional types of color cathode-ray tubes. It is clearly applicable in forming screens of the type described in U.S. Letters Patent 3,114,065 in which each elemental image area may comprise a filter component and a superposed and colorimetrically correlated phosphor componnet coextensive with its filter component but not in overlapping relation with its neighbors.

It is preferable that each of the sets of filter components be a continuous coating over over the associated image elements of the substrate 10 but that is not a necessary limitation on the structure. If the filter component is discontinuous, perhaps having a crystalline form, acceptable results are nevertheless obtained if there is sufficient overlap of the crystals of the various filter components to provide the desired visible-light attenuator in the portions of the substrate that surround the multiplicity of elemental image areas.

A particularly attractive feature of the present invention is the elimination of any need to change the size of the mask apertures either as an accommodation for screening or after screening has been completed. In the process embodying the invention, the screen is formed with its apertures of the desired final size for use as the color-selection electrode of the tube in process. This is a great advantage with respect to uniformity, processing complications and cost. There is the added uniqueness of the present invention that the filter components of the visible-light attenuator or black surround may be formed concurrently with the phosphor deposits and thus simplify the fabrication of the screen.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:
1. The method of screening the image area of a color image reproducing device that includes a color-selection electrode with a predetermined pattern of transparent areas which method comprises:
  applying to said image area a plurality of sets of filters arranged in said predetermined pattern with said sets partially overlapping one another over said image area to form a configuration of elemental portions corresponding to but smaller in area than said individual transparent areas of said color-selection electrode, said sets of filters individually having a relatively high transmission efficiency for light of only a predetermined one of a corresponding plurality of primary colors such that said elemental portions of said image area individually have a relatively high transmission efficiency for light of an assigned one of said primary colors and are individually surrounded by overlapping filters which attenuate substantially all wavelengths in the visible spectrum; and
  applying to each of said elemental portions of said image area a phosphor which when excited by electrons traversing said transparent areas of said color-selection electrode emits light at least including a component of the respectively assigned one of said primary colors.

2. The method in accordance with claim 1 in which said applying step comprises for each said primary color the further steps of;
  covering said image area with a material which establishes a surface condition that may be altered by exposure to energy;
  exposing said image area through said color-selection electrode, from a source positioned to simulate the electron gun of the image reproducing device for exciting a particular set of said elemental portions to form a latent image of the set of filters having high transmission efficiency for the primary color assigned to said exposed set of elemental portions; and
  developing said latent image in forming said set of filters.

3. The method in accordance with claim 2 in which in applying each of said sets of filters to said image area, said image area is coated with an organic photosensitive material and is exposed to actinic energy of a particular intensity and for an interval to expose selected portions of said coating corresponding in configuration and size to that desired for a set of said filters.

4. The method in accordance with claim 3 in which in applying each of said sets of filters to said image area, said coating has in suspension a fusible filter material in pulverulent form;

and in which said image area is heated to fuse said filter material and secure said filter material to said selected portions of said image area determined by said exposure.

5. The method in accordance with claim 3 in which in applying each of said sets of filters to said image area, said photosensitive material is a photoconductor, in which a desired surface condition is established over said image by the step of uniformly charging said photoconductor, in which exposure by said actinic energy creates a latent charge image of said set of filters;

and in which said charge image is developed by applying to said image area a polarized toner conveying said filter material in pulverulent form.

6. The method in accordance with claim 5 wherein said toner is substantially non-conductive and in which in applying each of said sets of filters to said image area, phosphor material, which emits light of the primary color to which said filter material is highly transmissive, is applied over said filter material without recharging said photoconductor.

7. The method in accordance with claim 6 in which in applying each of said sets of filters to said image area, said phosphor material is applied concurrently with said filter material by the step of applying to said image area, after said exposure step, a polarized toner having said filter material and said phosphor material in suspension but with such relative densities that said filter material settles onto said image area first and said phosphor material settles on top of said filter material.

8. The method in accordance with claim 6 in which in applying each of said sets of filters to said image area, after said filter material has been applied, the toner for said filter material is poured off said image area and a second polarized toner, carrying said phosphor in suspension, is applied to said image area and said phosphor is settled out on top of said filter material.

9. The method of screening the image area of a color image reproducing device that has a color-selection electrode with a predetermined pattern of transparent areas, which method comprises:

covering said image area with a layer of an organic material that may retain a surface charge;

exposing a corresponding pattern of selected elemental areas of said layer to energy projected thereon through said color-selection electrode from a source positioned to simulate an electron gun of the image reproducing device to form a latent charge image of one set of elemental areas to be scanned by the simulated electron gun during the operation of said tube;

developing said latent charge image by applying to said image area a polarized toner conveying a fusible filter material in pulverulent form having a high transmission efficiency for light of only the color assigned to said set of elemental image areas and a relatively low transmission efficiency for light in the remainder of the visible spectrum;

further developing said latent charge image by applying over said filter material a powdered phosphor material which emits light of the primary color to which said filter material is highly transmissive;

and heating said image area to fuse said filter material to said selected elemental areas in which the steps of exposing and developing are carried out for each of a plurality of primary colors prior to said heating step;

and in which said patterns of selected elemental areas are partially overlapped to provide an image area consisting of selected elemental areas capable of emitting light of different primary colors surrounded by areas of overlapping filters substantially non-transmissive of visible light.

References Cited
UNITED STATES PATENTS

| | | | |
|---|---|---|---|
| 3,344,301 | 9/1967 | Kaplan | 313—92 |
| 3,475,169 | 10/1969 | Lange | 96—1 |

JOHN C. COOPER III, Primary Examiner

U.S. Cl. X.R.

96—1, 36.2; 117—33.5 C, 33.5 CM, 33.5 P; 313—85 R, 85 S, 92 R, 92 B